（12）United States Patent
Jo et al.

(10) Patent No.: US 11,566,707 B2
(45) Date of Patent: Jan. 31, 2023

(54) VEHICLE PARKING DEVICE AND VEHICLE TRANSMISSION INCLUDING THE SAME

(71) Applicant: NEOOTO CO., LTD., Seoul (KR)

(72) Inventors: Seung Hyun Jo, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 17/219,908

(22) Filed: Apr. 1, 2021

(65) Prior Publication Data

US 2021/0310558 A1 Oct. 7, 2021

(30) Foreign Application Priority Data

Apr. 2, 2020 (KR) .......................... 10-2020-0040470

(51) Int. Cl.
*F16H 63/34* (2006.01)
(52) U.S. Cl.
CPC ..... *F16H 63/3466* (2013.01); *F16H 63/3425* (2013.01)
(58) Field of Classification Search
CPC ........ F16H 63/34–63/3491; F16H 2063/3059; F16H 2063/3066; F16H 19/04; F16H 1/06; F16H 1/08; F16H 1/16; B60T 1/005; B60T 1/062; B60T 7/107; B60T 13/746; F16D 63/006; F16D 2125/42
USPC .............................. 192/219.5; 74/89.14, 109
See application file for complete search history.

(56) References Cited

U.S. PATENT DOCUMENTS

| | | | | |
|---|---|---|---|---|
| 2,875,856 | A * | 3/1959 | Mrlik .................. | F16H 63/3416 192/219.5 |
| 4,765,651 | A * | 8/1988 | Unger .................. | B60R 22/023 74/89.14 |
| 8,839,937 | B2 * | 9/2014 | Hazama ............. | F16H 63/3466 192/219.5 |

FOREIGN PATENT DOCUMENTS

| | | |
|---|---|---|
| KR | 20100053278 | 5/2010 |
| KR | 20160025297 | 3/2016 |

OTHER PUBLICATIONS

English language translation of KR 20160025297 A retrieved from http://engpat.kipris.or.kr on May 21, 2022. (Year: 2022).*
"Office Action of Korea Counterpart Application", dated Apr. 1, 2021, with English translation thereof, pp. 1-14.

\* cited by examiner

*Primary Examiner* — Richard M Lorence
(74) *Attorney, Agent, or Firm* — JCIPRNET

(57) ABSTRACT

Provided are a vehicle parking device and a vehicle transmission. The vehicle parking device includes an actuator configured to rotate a worm gear mounted at an end thereof, a loading unit including a rack gear engaged with the worm gear and linearly moving according to a movement of the rack gear, a parking sprag in contact with the loading unit and rotating by a linear movement of the loading unit, and a parking gear provided in a drive shaft that transmits a driving force and selectively engaged according to a rotation of the parking sprag.

5 Claims, 6 Drawing Sheets

VEHICLE PARKING DEVICE AND VEHICLE TRANSMISSION INCLUDING THE SAME

CROSS-REFERENCE TO RELATED APPLICATIONS

This application is based on and claims priority under 35 U.S.C. § 119 to Korean Patent Application No. 10-2020-0040470, filed on Apr. 2, 2020, in the Korean Intellectual Property Office, the disclosure of which is incorporated by reference herein in its entirety.

BACKGROUND

1. Field

The disclosure relates to a device, and more particularly, to a vehicle parking device and a vehicle transmission.

2. Description of the Related Art

Electric vehicles refer to environment-friendly vehicles that do not discharge exhaust gas at all by using electricity as their power sources, unlike gasoline or diesel-based vehicles that use gasoline or diesel.

In general, automatic transmissions are devices that reciprocate among a parking mode "P mode", a reverse mode "R mode", a neutral mode "N mode", and a driving mode "D mode".

In this case, the parking mode is to limit movement when a vehicle is parked, and the reverse mode is a driving mode that transmits a driving force for reversing the vehicle. Also, the neutral mode is to separate an engine and a drive shaft from each other, and the driving mode is a driving mode that transmits a driving force for moving the vehicle forward in contrast with the reverse mode.

For a parking system of automatic transmissions of the related art, when the gear is at the P mode, a series of processes moving from a gear lever to a manual shaft, a parking rod, and a parking sprag are performed. As such, the parking system of the automatic transmissions of the related art is operated so that, while the parking rod slidably reciprocates in connection with the operation of the gear lever, the parking gear and the parking sprag are engaged and disengaged.

However, the parking system of the related art may have a problem in that a large operating force is generated due to frictional resistance of a contact surface between the parking gear and the parking sprag during parking or when the parking mode is released, and shock or vibration is generated when the parking mode is released suddenly by ignoring the frictional resistance.

SUMMARY

The disclosure provides a vehicle parking device and a vehicle transmission including the same, capable of stably and accurately implementing a parking mode. However, this is merely an example, and the scope of the disclosure is not limited thereby.

Additional aspects will be set forth in part in the description which follows and, in part, will be apparent from the description, or may be learned by practice of the presented embodiments of the disclosure.

According to an embodiment of the disclosure, a vehicle parking device includes an actuator configured to rotate a worm gear mounted at an end thereof, a loading unit including a rack gear engaged with the worm gear and linearly moving according to a movement of the rack gear, a parking sprag in contact with the loading unit and rotating by a linear movement of the loading unit, and a parking gear provided in a drive shaft that transmits a driving force and selectively engaged according to a rotation of the parking sprag.

The loading unit may include a housing having an inclined surface, at an end thereof, in contact with the parking sprag, a support shaft extending in a longitudinal direction of the housing and having the rack gear mounted thereon, and a first elastic member inserted into the support shaft and in contact with the rack gear.

The rack gear may linearly move according to a rotation of the worm gear, receive a compressive force from the first elastic member, and linearly move together with the housing to rotate the parking sprag.

The parking sprag may include a body, a protruding end arranged at an end of the body and inserted into the parking gear, and an inclined end arranged so that a portion of the loading unit is inserted thereinto, the inclined end being in surface contact with the inclined surface of the loading unit.

The vehicle parking device may further include a rod into which the parking sprag is inserted, and a second elastic member inserted into the rod and arranged so that an end thereof is in contact with the parking sprag.

According to another embodiment of the disclosure, a vehicle transmission includes a casing, a first driving unit provided inside the casing and receiving a driving force, a second driving unit provided inside the casing and spaced apart from the first driving unit, a third driving unit between the first driving unit and the second driving unit to transmit a driving force, and a parking device provided in at least one of the first driving unit to the third driving unit, and the parking device includes an actuator configured to rotate a worm gear mounted at an end thereof, a loading unit inserted into a mounting groove of the casing, including a rack gear engaged with the worm gear, and linearly moving according to a movement of the rack gear, a parking sprag in contact with the loading unit and rotating by a linear movement of the loading unit, and a parking gear provided in at least one of the first driving unit to the third driving unit and selectively engaged according to a rotation of the parking sprag.

These and/or other aspects will become apparent and more readily appreciated from the following detailed description of the embodiments, the accompanying drawings, and claims.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
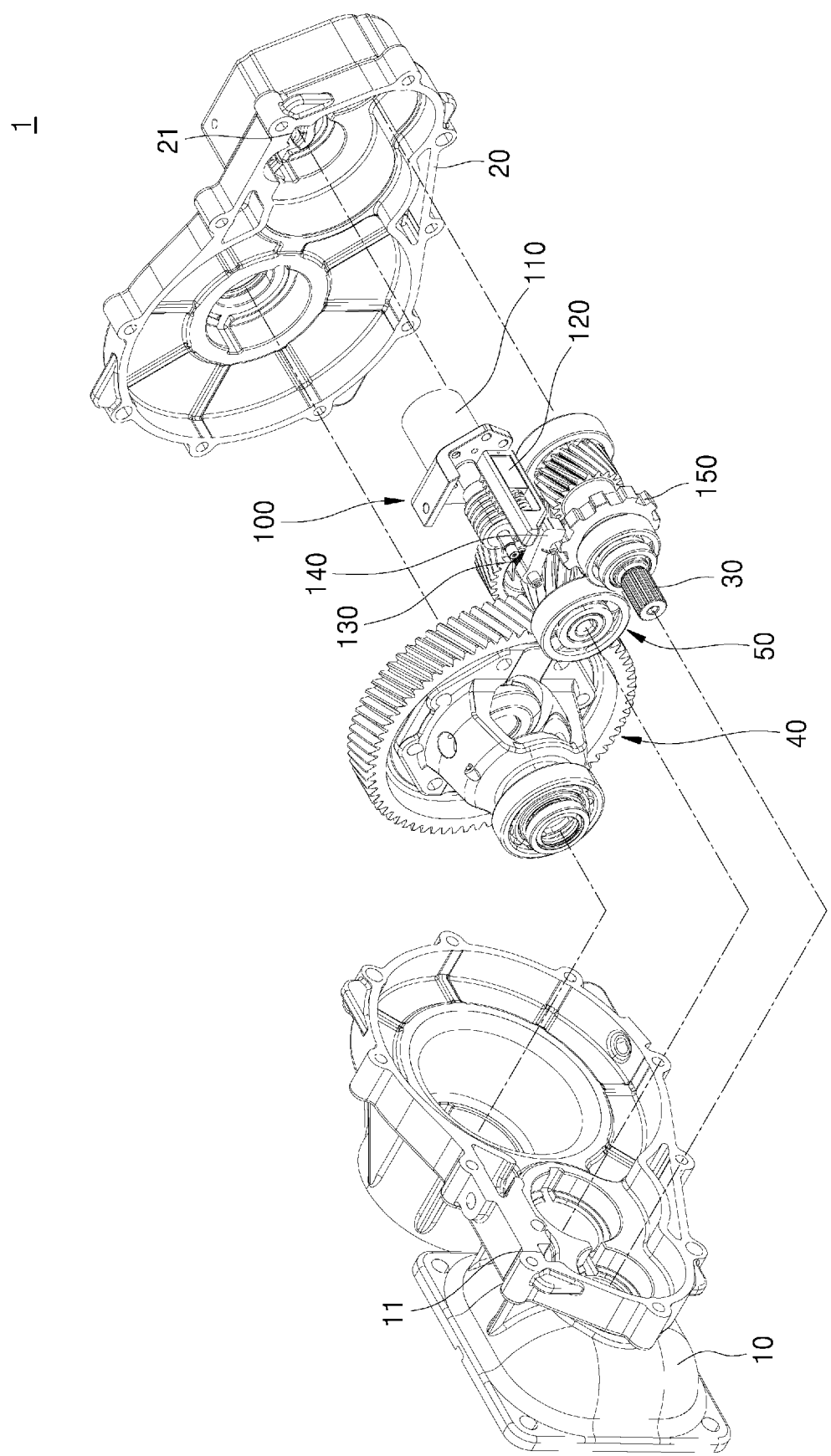
FIG. 1 is an exploded perspective view illustrating a vehicle transmission, according to an embodiment of the disclosure.

Reference will now be made in detail to embodiments, examples of which are illustrated in the accompanying drawings, wherein like reference numerals refer to like elements throughout. In this regard, the present embodiments may have different forms and configuration and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure will be described in connection with the accompanying drawings. Because various modifications may be applied and one or more embodiments may be implemented, specific embodiments will be shown in the drawings and described in detail in the detailed description. However, the present embodiments should not be construed as being limited to the specific embodiments set forth herein and should be understood as including all modifications and/or equivalents included in the spirit and scope of the disclosure. With regard to the description of the drawings, like reference numerals are used to indicate like elements.

It will be understood that the terms "including," "having," and "comprising" used in various embodiments of the disclosure are intended to indicate the existence of the features, operations, or elements described in the disclosure, and are not intended to limit the existence of additional one or more features, operations, or elements. Also, it will be understood that the terms "including," "having," and "comprising" in various embodiments of the disclosure are intended to indicate the existence of features, numbers, steps, operations, elements, and parts, described in the specification, or combinations thereof, and are not intended to preclude the possibility that one or more other features, numbers, steps, operations, elements, and parts, or combinations thereof may exist or may be added.

The expression "or" used herein includes any and all combinations of the features or elements listed together. For example, the expression "A or B" indicates only A, only B, or both A and B.

It will be understood that although the terms "first", "second", etc. may be used herein to describe various elements, these elements should not be limited by these terms. For example, the order and/or importance of the elements are not limited by these terms. These terms may be used to distinguish one element from another. For example, a first user device and a second user device are both user devices and indicate different user devices. Also, a first element may be referred to as a second element, and similarly, the second element may be referred to as the first element, without departing from the scope of rights of the disclosure.

It will be understood that, when an element is referred to as being "connected" or "coupled" to another element, it can be directly connected or coupled to the other element, or can be connected or coupled to the other element with intervening elements interposed therebetween. In contrast, it will be understood that, when an element is referred to as being "directly connected" or "directly coupled" to another element, there are no intervening elements interposed between the element and the other element.

It should be understood that terms or expressions described herein should be considered in a descriptive sense only and not for purposes of limitation. The singular forms "a," "an," and "the" are intended to include the plural forms as well, unless the context clearly indicates otherwise.

Unless otherwise defined, all terms including technical or scientific terms used herein have the same meaning as commonly understood by those of ordinary skill in the art to which various embodiments of the disclosure belong.

Terms as those defined in commonly used dictionaries should be construed as having meanings consistent with the meanings in the context of the related technologies, and should not be construed as ideal or excessively formal meanings unless explicitly defined in various embodiments of the disclosure.

FIG. 1 is an exploded perspective view illustrating a vehicle transmission 1, according to an embodiment of the disclosure.

Referring to FIG. 1, the vehicle transmission 1 may include a first casing 10, a second casing 20, a first driving unit 30, a second driving unit 40, a third driving unit 50, and a vehicle parking device 100.

The first casing 10 and the second casing 20 are assembled and thus form an external appearance of the vehicle transmission 1. The first driving unit 30, the second driving unit 40, the third driving unit 50, and the vehicle parking device 100 may be provided in an inner space of the first casing 10 and the second casing 20.

The first driving unit 30 may receive a driving force, and one end of the first driving unit 30 may be inserted into an opening of the first casing 10 to protrude to the outside. The first driving unit 30 may be set to an input shaft of the vehicle transmission 1.

The second driving unit 40 may be spaced apart from the first driving unit 30 and may be selectively drive-connected to the first driving unit 30. The second driving unit 40 may be set to an output shaft.

The third driving unit 50 may be provided between the first driving unit 30 and the second driving unit 40. Bearings fixed to the first casing 10 and the second casing 20 may be arranged on both ends of the third driving unit 50.

The vehicle parking device 100 may be provided in at least one of the first driving unit 30 to the third driving unit 50. A parking gear 150 is provided in a drive shaft of the first driving unit 30 to the third driving unit 50, and a parking sprag 140 of the vehicle parking device 100 is engaged with the parking gear 150 upon driving of an actuator 110, and thus, the vehicle parking device 100 may be set to a parking mode. However, for convenience of description, a case where the vehicle parking device 100 is provided in the first driving unit 30 will be mainly described hereinbelow.

Figure 2:
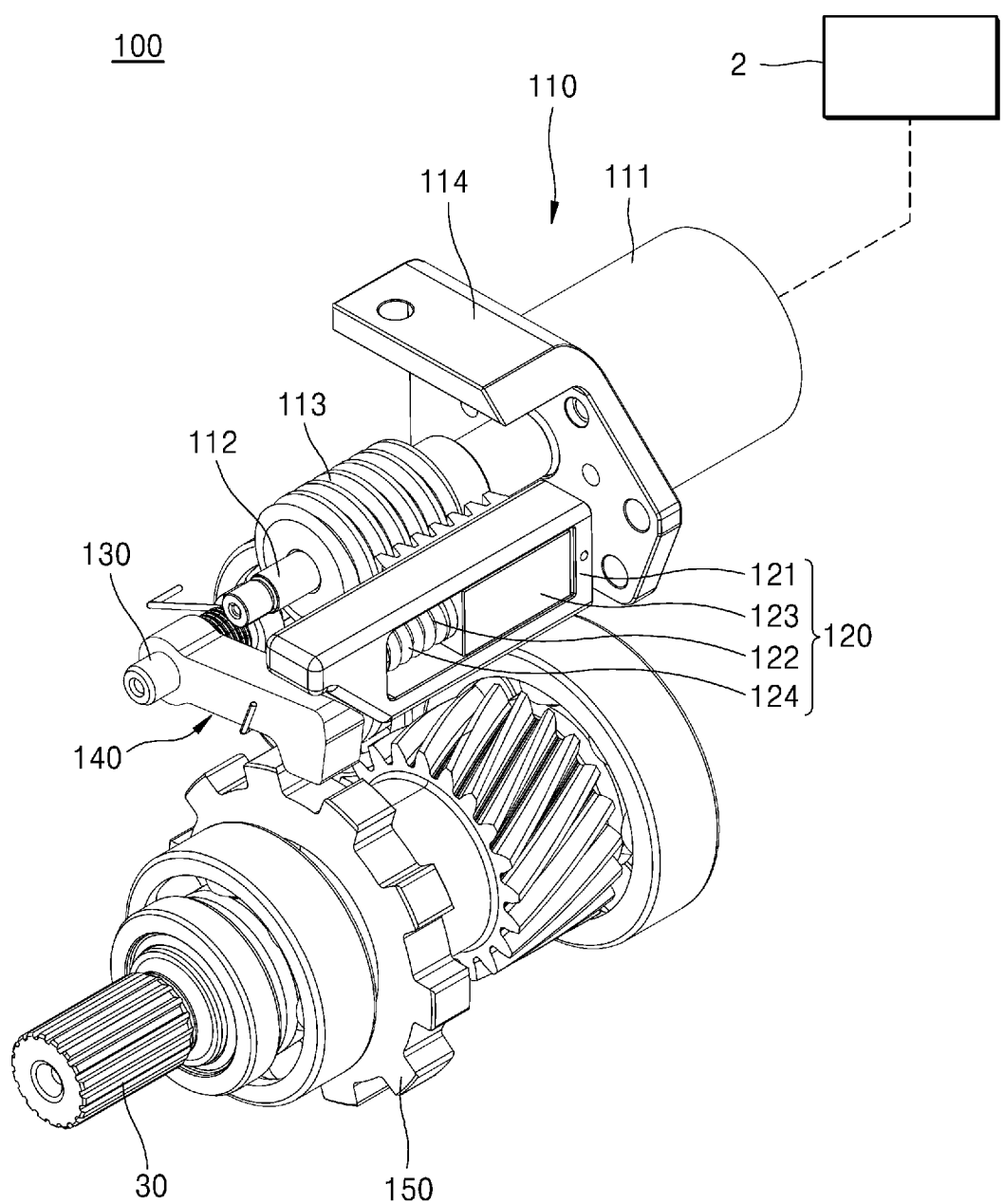
FIG. 2 is an exploded perspective view illustrating a vehicle parking device in FIG. 1.
Figure 3:
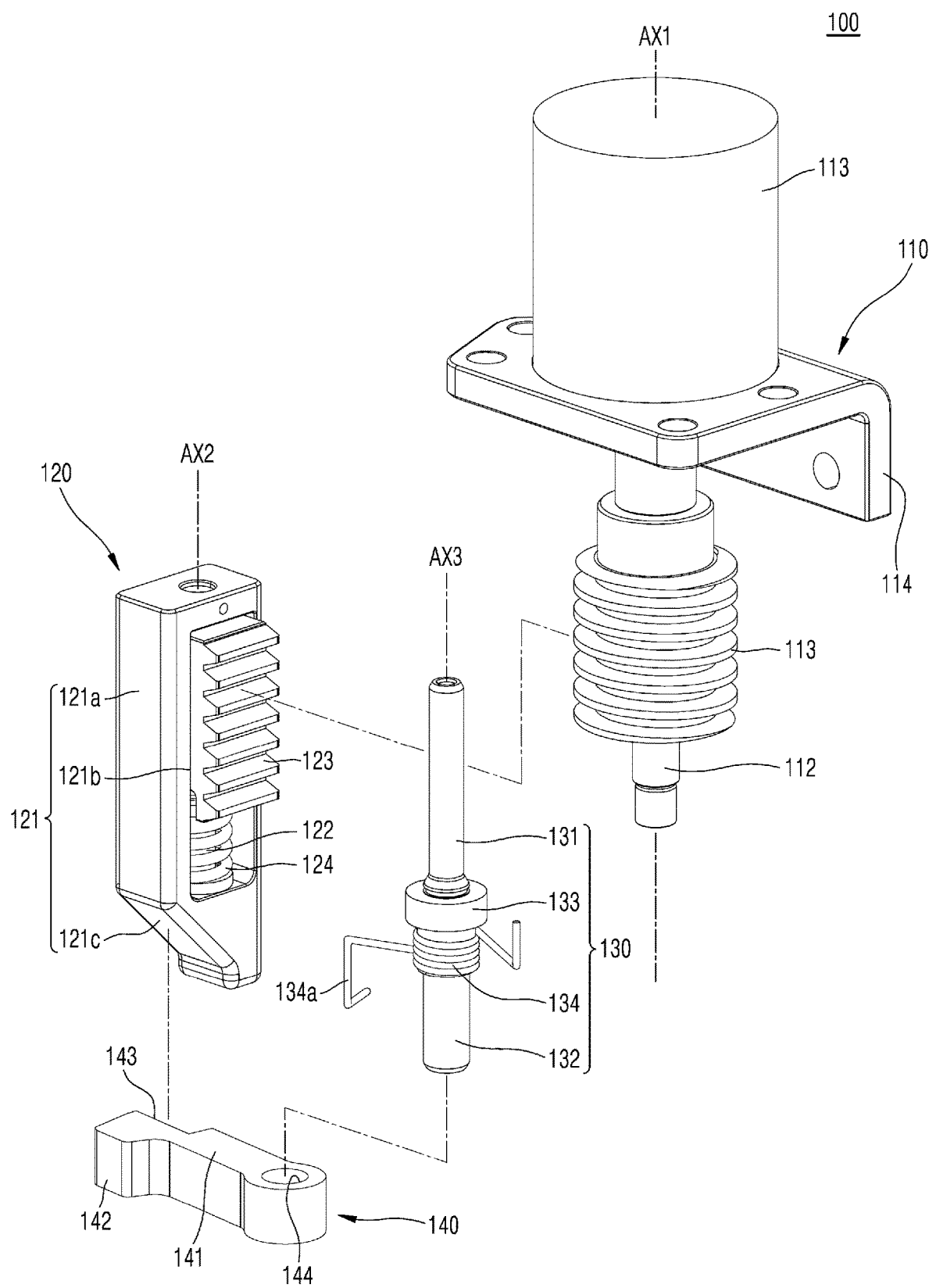
FIG. 3 is an exploded perspective view illustrating a portion of a vehicle parking device in FIG. 2.

FIG. 2 is an exploded perspective view illustrating the vehicle parking device 100 in FIG. 1, and FIG. 3 is an exploded perspective view illustrating a portion of the vehicle parking device 100 in FIG. 2.

Referring to FIGS. 2 and 3, the vehicle parking device 100 may include the actuator 110, a loading unit 120, a shaft unit 130, the parking sprag 140, and the parking gear 150.

The vehicle parking device 100 is connected to a controller 2, and as the actuator 110 is driven according to a signal from the controller 2, the vehicle parking device 100 may switch to the parking mode. That is, when a user switches a gear knob (not shown) to the parking mode, the vehicle parking device 100 may be driven by an electrical signal generated by the controller 2.

The actuator 110 may rotate a worm gear 113 provided at an end thereof. The actuator 110 may include a driver 111, a drive shaft 112, and the worm gear 113. The actuator 110 may rotate the drive shaft 112 by receiving a signal from the controller 2.

The worm gear 113 may be provided at an end of the drive shaft 112 and engaged with a rack gear 123. A driving force is generated in the driver 111, and the drive shaft 112 rotates with respect to a first axis AX1. In this case, the worm gear 113 may also rotate with the drive shaft 112.

The actuator 110 may rotate clockwise or counterclockwise. For example, the loading unit 120 may descend by rotating the actuator 110 clockwise, or the loading unit 120 may ascend by rotating the actuator 110 counterclockwise. Also, in contrast, the loading unit 120 may descend by rotating the actuator 110 counterclockwise, or the loading unit 120 may ascend by rotating the actuator 110 clockwise.

The actuator 110 may control the number of rotations or a rotation speed of the drive shaft 112. When the number of rotations of the drive shaft 112 is controlled according to the signal from the controller 2, a moving distance of the rack gear 123 or a moving distance of the loading unit 120 may be set. Also, when the rotation speed of the drive shaft 112 is controlled according to the signal from the controller 2, a moving speed of the rack gear 123 or an ascending/descending speed of the loading unit 120 may be set.

The actuator 110 may include a joint block 114. The joint block 114 may support the driver 111 and may be attached to the second casing 20. The joint block 114 may fix a position of the actuator 110.

The loading unit 120 may linearly reciprocate according to driving of the actuator 110. One side of the loading unit 120 is in contact with the actuator 110, and the other side of the loading unit 120 is in contact with the parking sprag 140. The loading unit 120 may rotate the parking sprag 140 while moving up and down according to the driving of the actuator 110.

The loading unit 120 may include a housing 121, a support shaft 122, the rack gear 123, and a first elastic member 124.

The housing 121 extends to a certain length along a second axis AX2. The housing 121 may include a main body 121*a*, a front opening 121*b*, and an inclined surface 121*c*. The housing 121 may have the inclined surface 121*c* in surface contact with the parking sprag 140.

The housing 121 may be inserted into a first mounting groove 11 of the first casing 10 and/or a second mounting groove 21 of the second casing 20 and may linearly move in the mounting grooves. For example, the housing 121 is inserted into the first mounting groove 11 of the first casing 10 and the second mounting groove 21 of the second casing 20, and linearly moves in the first mounting groove 11 and the second mounting groove 21 when the loading unit 120 is driven.

The support shaft 122, the rack gear 123, and the first elastic member 124 may be arranged in an inner space at an upper end of the main body 121*a*. The inclined surface 121*c* may be arranged at a lower end of the main body 121*a*.

The rack gear 123 protruding from the front opening 121*b* may be connected with the worm gear 113. The front opening 121*b* may extend to a certain length in a longitudinal direction of the main body 121*a*, and the rack gear 123 may move along the front opening 121*b*.

The inclined surface 121*c* may be arranged at the lower end of the main body 121*a* and may be in contact with an inclined end 143 of the parking sprag 140. The inclined surface 121*c* may have a same slope as the inclined end 143 to be in contact with the inclined end 143. When the housing 121 moves downward, the inclined surface 121*c* and the inclined end 143 slide so as to rotate the parking sprag 140.

The support shaft 122 may extend in a longitudinal direction of the housing 121 and have the rack gear 123 mounted thereon. The support shaft 122 is arranged along the second axis AX2 to guide movement of the rack gear 123 and is provided in the inner space of the main body 121*a*. The rack gear 123 may be arranged on an upper end of the support shaft 122, and the first elastic member 124 may be arranged at a lower end of the support shaft 122.

The rack gear 123 is engaged with the worm gear 113 and is inserted into the support shaft 122. The rack gear 123 protruding from the front opening 121*b* may linearly reciprocate along the support shaft 122 according to rotation of the worm gear 113. The rack gear 123 linearly moves according to the rotation of the worm gear 113, receives a repulsive force from the first elastic member 124, and linearly moves together with the housing 121 so that the housing 121 may apply a force to the parking sprag 140.

The first elastic member 124 may be inserted into the support shaft 122 and may be in contact with the rack gear 123. The first elastic member 124 may be defined as a member provided in the housing 121 to generate a repulsive force against the rack gear 123. For example, the first elastic member 124 may be a spring having a certain elasticity.

The first elastic member 124 may provide a repulsive force to the rack gear 123. When the rack gear 123 moves downward, the first elastic member 124 is compressed so as to generate a repulsive force with respect to a moving direction of the rack gear 123. Also, when the rack gear 123 moves upward, the first elastic member 124 expands so as to accelerate the movement of the rack gear 123.

When the shaft unit 130 is provided in the first casing 10 and the second casing 20, the shaft unit 130 may be connected to the parking sprag 140. A rotation axis of the parking sprag 140 is the same as a third axis AX3 extending in a longitudinal direction of the shaft unit 130, and the parking sprag 140 may rotate with respect to the third axis AX3.

The shaft unit 130 may include a first rod 131 inserted into the second casing 20, and a second rod 132 into which the parking sprag 140 is inserted. A diameter of the second rod 132 may be greater than a diameter of the first rod 131.

A stopping protrusion 133 may be between the first rod 131 and the second rod 132. The stopping protrusion 133 is formed to be stepped, and may prevent a second elastic member 134 from deviating toward the first rod 131.

The second elastic member 134 is inserted into the second rod 132 and is between the parking sprag 140 and the stopping protrusion 133. One end 134*a* of the second elastic member 134 may support the parking sprag 140. The second elastic member 134 may have a shape of an elastic spring in which the end 134*a* is bent, and the parking sprag 140 may be supported on a bent end.

The second elastic member 134 may provide a restoring force to the parking sprag 140. When the parking sprag 140 is engaged with the parking gear 150, the second elastic member 134 generates a repulsive force against the parking sprag 140. When the rack gear 123 moves upward again, the parking sprag 140 returns to its original position and is separated from the parking gear 150 by the restoring force of the second elastic member 134.

Figure 4:
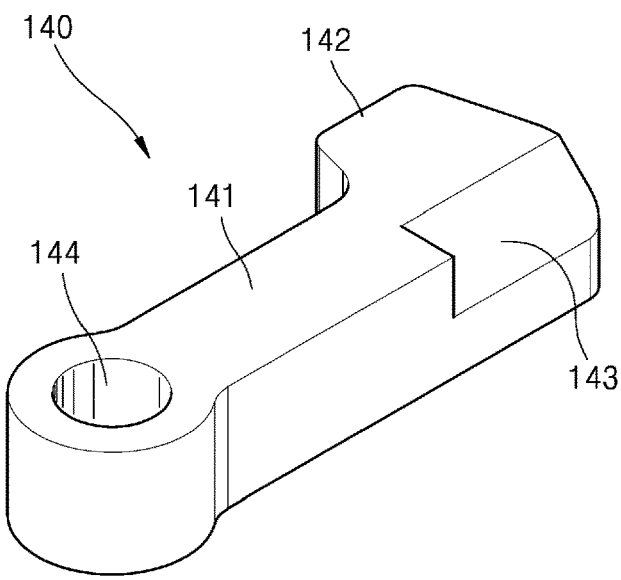
FIG. 4 is a perspective view of a parking sprag in FIG. 2.

FIG. 4 is a perspective view of the parking sprag 140 in FIG. 2.

Referring to FIGS. 3 and 4, the parking sprag 140 may be arranged in contact with the loading unit 120 and may be rotated by the linear reciprocation of the loading unit 120. The parking sprag 140 may be supported on the shaft unit 130 and selectively engaged with the parking gear 150.

The parking sprag 140 may include a body 141, a protruding end 142, the inclined end 143, and a rotation hole 144. The body 141 may extend in one direction to have a certain length. The rotation hole 144 may have the second rod 132 inserted thereinto and may be set to a drive shaft of the parking sprag 140.

The protruding end 142 is arranged on one side of an end of the body 141. The protruding end 142 may be inserted into a gear tooth of the parking gear 150. When the parking sprag 140 rotates in one direction, the protruding end 142 is engaged with the gear tooth of the parking gear 150. On the contrary, when the parking sprag 140 rotates in the other direction, the protruding end 142 is separated from the gear tooth of the parking gear 150.

The inclined end 143 is arranged on the other side of the end of the body 141. The inclined end 143 may be arranged on a side opposite to the protruding end 142. The inclined end 143 may be arranged so that an end of the loading unit 120 is inserted thereinto and may be in contact with the inclined surface 121c of the loading unit 120. The inclined end 143 may have substantially the same inclination angle as the inclined surface 121c. As a result, the inclined end 143 and the inclined surface 121c may be in surface contact with each other.

A position of the parking gear 150 is determined according to a position at which the vehicle parking device 100 is provided. The parking gear 150 may be provided on a drive shaft of any one of the first driving unit 30 to the third driving unit 50. However, for convenience of description, a case where the parking gear 150 is provided on the drive shaft of the first driving unit 30 will be mainly described hereinbelow.

The parking gear 150 is provided on the drive shaft that transmits a driving force, and may be selectively engaged according to rotation of the parking sprag 140. The parking gear 150 is integrally assembled to the drive shaft and rotates together with the drive shaft. Accordingly, when the parking gear 150 is locked, the drive shaft also does not move, and thus, the parking mode may be set.

Figure 5:
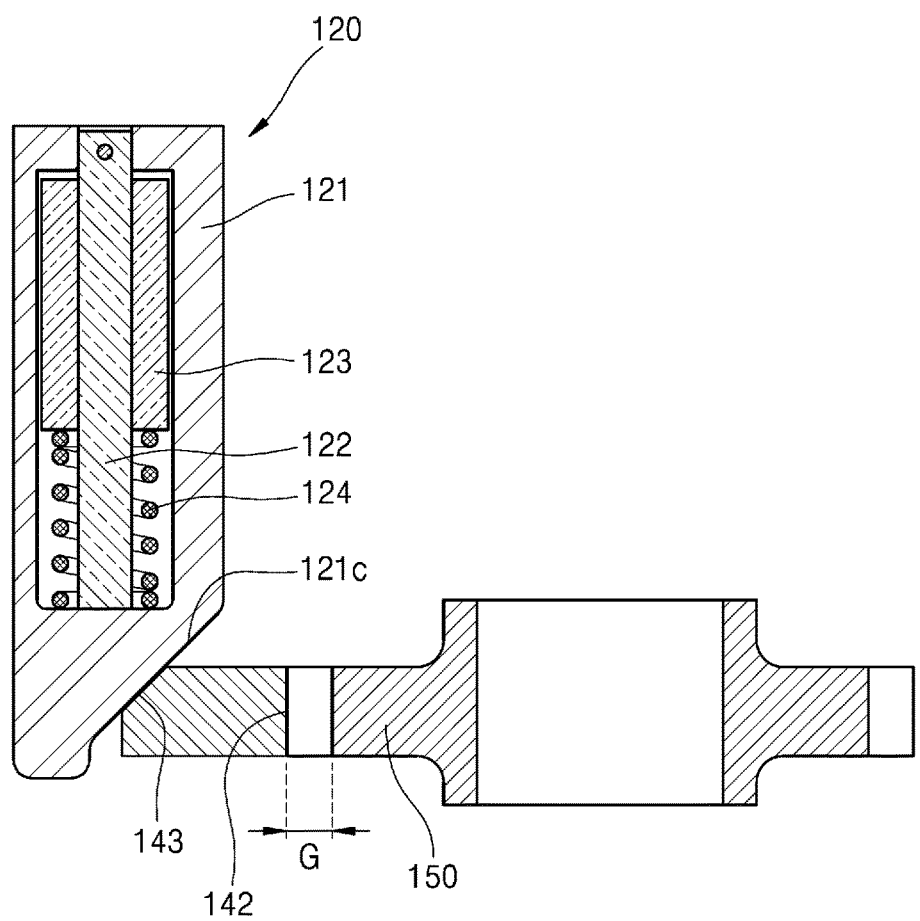
FIG. 5 is a cross-sectional view illustrating an arrangement of a loading unit, a parking sprag, and a parking gear in FIG. 2.
Figure 6:
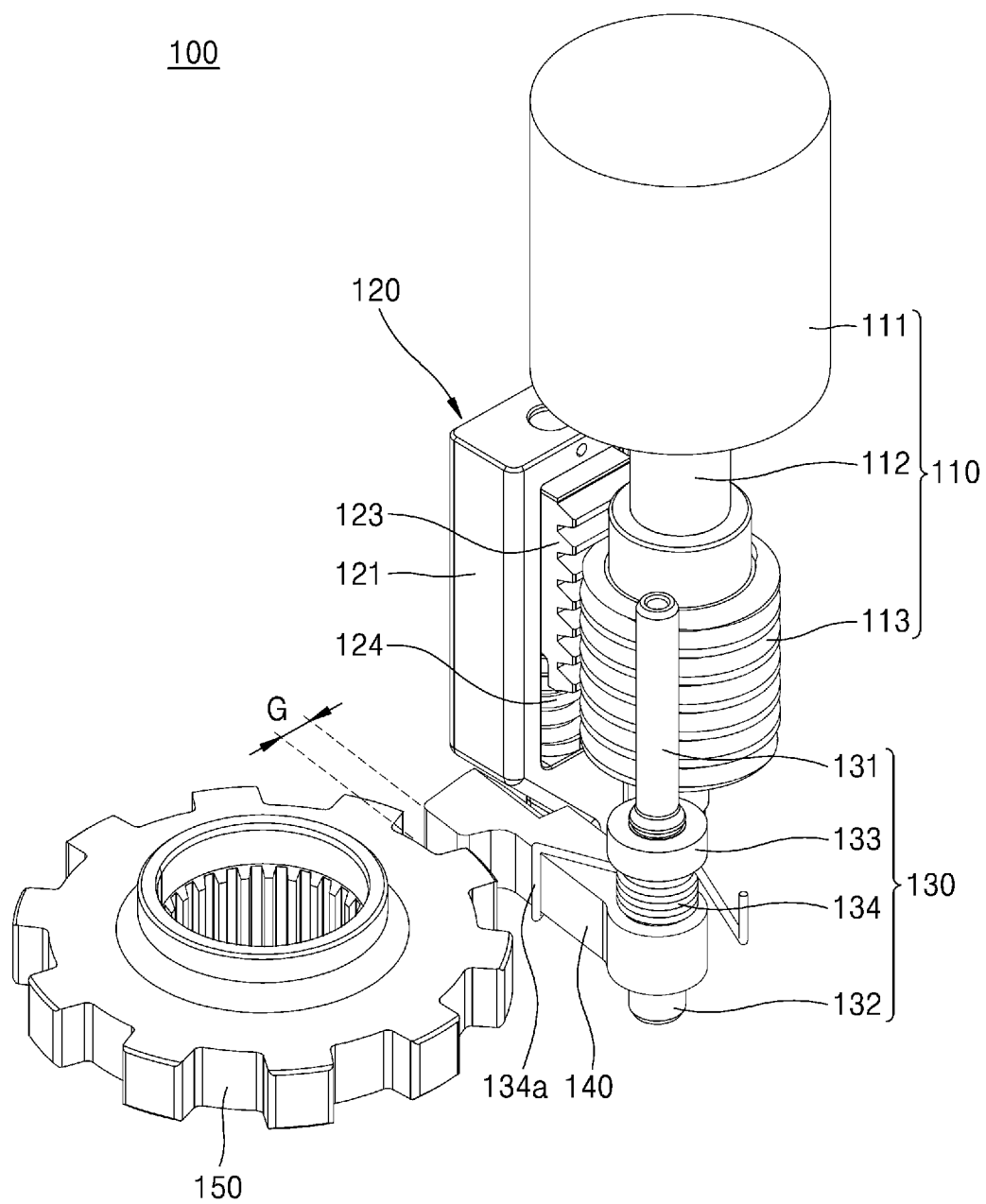
FIGS. 6 and 7 are perspective views illustrating driving of a vehicle parking device.
Figure 7:
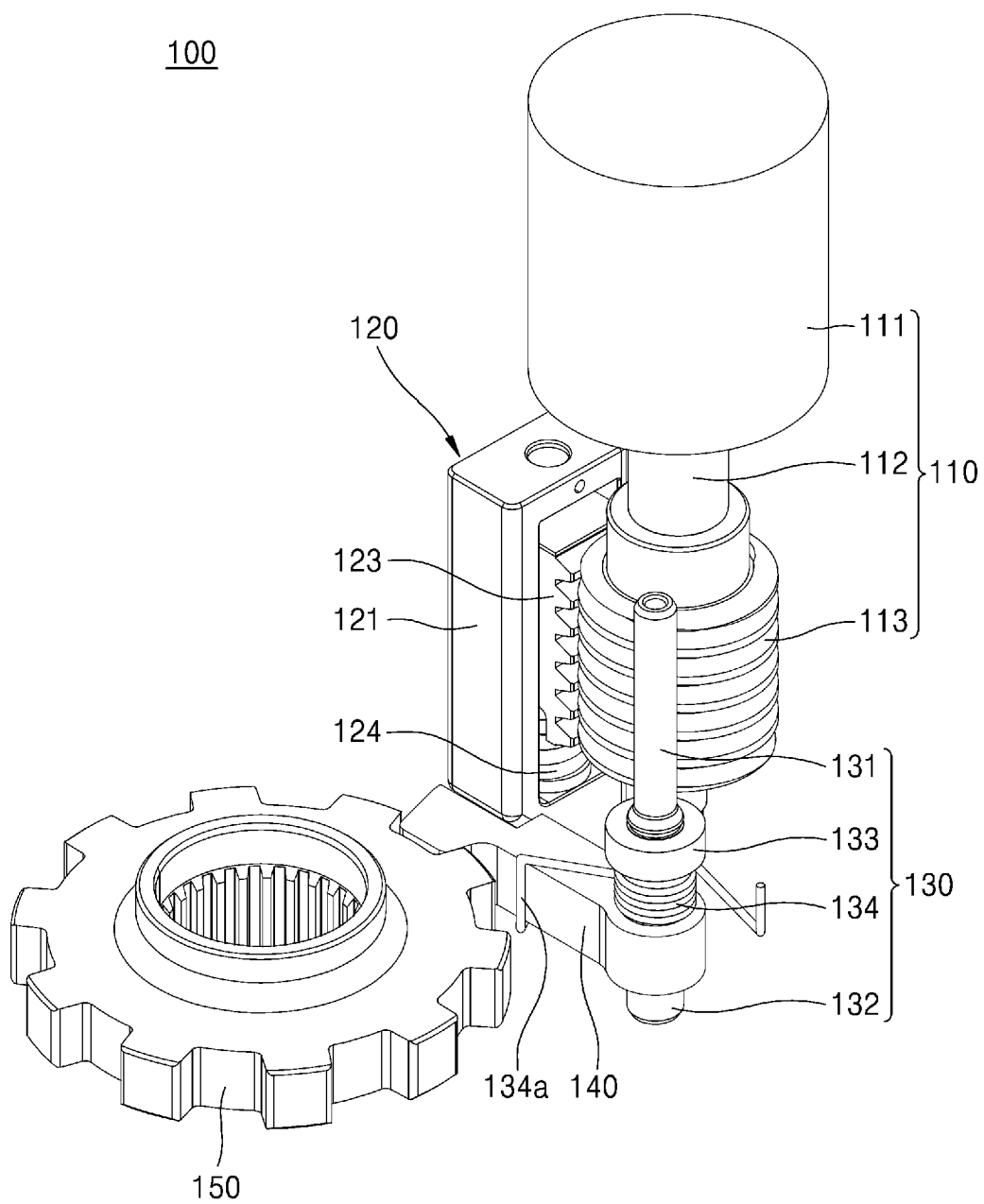

FIG. 5 is a cross-sectional view illustrating an arrangement of the loading unit 120, the parking sprag 140, and the parking gear 150 in FIG. 2, and FIGS. 6 and 7 are perspective views illustrating driving of the vehicle parking device 100.

Referring to FIGS. 5 and 6, when the parking mode is not set, the parking sprag 140 and the parking gear 150 are separated from the vehicle parking device 100.

The inclined surface 121c of the housing 121 maintains its contact with the inclined end 143 of the parking sprag 140. The protruding end 142 of the parking sprag 140 is arranged to be spaced apart from the gear tooth of the parking gear 150 by G, and the parking sprag 140 and the parking gear 150 are separated in a driving manner. Accordingly, when the parking mode is not set, when the drive shaft rotates, the parking gear 150 rotates together.

Referring to FIG. 7, when it switches to the parking mode, the parking sprag 140 and the parking gear 150 are engaged in the vehicle parking device 100.

When the worm gear 113 rotates in one direction upon driving of the actuator 110, the rack gear 123 moves downward. Because the first elastic member 124 supports below the rack gear 123, the first elastic member 124 is compressed by descending of the rack gear 123.

Also, as the rack gear 123 descends, the housing 121 also moves downward, and when the inclined surface 121c of the housing 121 moves downward, the inclined end 143 of the parking sprag 140 moves upward of the inclined surface 121c and rotates with respect to the shaft unit 130, and the protruding end 142 of the parking sprag 140 is engaged with the parking gear 150.

Because the end 134a of the second elastic member 134 is supported on the parking sprag 140, when the parking sprag 140 rotates, a repulsive force is generated in an opposite direction.

A vertical movement of the loading unit 120 generates a rotational movement of the parking sprag 140, and thus, the vehicle parking device 100 may execute the parking mode simply and securely. The inclined surface 121c of the loading unit 120 and the inclined end 143 of the parking sprag 140 are inclined to be in surface contact with each other so that the vertical movement of the loading unit 120 is converted into a force applied to the parking sprag 140 in a lateral direction. The vehicle parking device 100 may switch directions without loss of a force and thus implement the parking mode stably.

The vehicle parking device 100 may accurately couple the parking sprag 140 to the parking gear 150 by using a compressive force of the first elastic member 124. When the rack gear 123 moves downward, the first elastic member 124 is also compressed. The compressive force generated by the first elastic member 124 is transmitted to the parking sprag 140, and thus, the protruding end 142 of the parking sprag 140 may be engaged with the parking gear 150. In particular, when there is a phase difference between the protruding end 142 of the parking sprag 140 and a groove of the parking gear 150, the protruding end 142 may be inserted into the parking gear 150 by using the compressive force of the first elastic member 124 applied to the parking sprag 140.

Thereafter, when the actuator 110 rotates the worm gear 113 in an opposite direction, the rack gear 123 ascends. In this case, as the first elastic member 124 expands, the movement of the rack gear 123 may be guided. At the same time, by the restoring force generated by the second elastic member 134, the parking sprag 140 may be separated from the parking gear 150.

Because the end 134a of the second elastic member 134 maintains its contact with the parking sprag 140, a repulsive force acts when the parking sprag 140 rotates for parking. When the rack gear 123 ascends, the repulsive force of the second elastic member 134 causes the parking sprag 140 to return to its original position. That is, when the loading unit 120 ascends, the second elastic member 134 applies a force to the parking sprag 140 so that the inclined end 143 returns to its original position while moving downward of the inclined surface 121c.

According to an embodiment of the disclosure, the vehicle transmission 1 and the vehicle parking device 100 selectively couple the parking sprag 140 to the parking gear 150 upon driving of the actuator 110, and thus may implement the parking mode accurately and precisely. In detail, because the worm gear 113 of the actuator 110 and the rack gear 123 of the loading unit 120 are engaged with each other, the loading unit 120 moves up and down upon driving of the actuator 110. Thus, a moving distance of the loading unit 120 and a rotation angle of the parking sprag 140 may be precisely controlled by adjusting the driving of the actuator 110.

According to an embodiment of the disclosure, the vehicle transmission 1 and the vehicle parking device 100 convert the vertical movement of the loading unit 120 into the rotational movement of the parking sprag 140, and thus, may implement the parking mode accurately. Because the inclined surface 121*c* of the loading unit 120 and the inclined end 143 of the parking sprag 140 are arranged to be in surface contact with each other, the vertical movement of the loading unit 120 may be converted into the rotational movement of the parking sprag 140 without energy loss.

According to an embodiment of the disclosure, the parking sprag 140 may be engaged with or disengaged from the parking gear 150 due to a compressive force or a repulsive force generated upon driving of the vehicle transmission 1 and the vehicle parking device 100. In detail, when the loading unit 120 moves downward, the first elastic member 124 is compressed so that the protruding end 142 is engaged with the parking gear 150 with a strong impact. In particular, even though there is a phase difference between the parking gear 150 and the parking sprag 140, the compressive force generated by the first elastic member 124 may cause the parking sprag 140 to be engaged with the parking gear 150. Also, when the loading unit 120 moves upward, the repulsive force of the second elastic member 134 causes the parking sprag 140 to return to its original position so that the parking mode may be quickly released.

According to an embodiment of the disclosure, the vehicle transmission 1 and the vehicle parking device 100 are compactly configured, and thus have a number of parts and a volume less than those of a parking device of the related art. Furthermore, a self-reduction ratio of the worm gear 113 and the rack gear 123 may be used so that the actuator 110 may be lightened, and parts may be easily assembled and exchanged and thus may be easily maintained. Also, the vehicle parking device 100 may be prevented from being secondarily released due to engagement between the worm gear 113 and the rack gear 123.

According to an embodiment of the disclosure, a vehicle transmission and a vehicle parking device may implement the parking mode accurately and precisely. Because a worm gear of an actuator and a rack gear of a loading unit are engaged with each other, the loading unit moves up and down upon driving of an actuator. Thus, a moving distance of the loading unit and a rotation angle of a parking sprag may be precisely controlled by adjusting the driving of the actuator. Also, an inclined surface of the loading unit and an inclined end of the parking sprag are arranged to be in surface contact with each other, a vertical movement of the loading unit may be converted into a rotational movement of the parking sprag without energy loss.

According to an embodiment of the disclosure, the parking sprag may be engaged with or disengaged from a parking gear due to a compressive force or a repulsive force generated upon driving of the vehicle transmission and the vehicle parking device. When the loading unit moves downward, a first elastic member is compressed so that a protruding end is engaged with the parking gear with a strong impact. In particular, even though there is a phase difference between the parking gear and the parking sprag, the compressive force generated by the first elastic member may cause the parking sprag to be engaged with the parking gear. Also, when the loading unit moves upward, a repulsive force of a second elastic member causes the parking sprag to return to its original position so that the parking mode may be quickly released.

According to an embodiment of the disclosure, the vehicle transmission and the vehicle parking device are compactly configured, and thus have a number of parts and a volume less than those of a parking device of the related art. Furthermore, a self-reduction ratio of the worm gear and the rack gear may be used so that the actuator may be lightened, and parts may be easily assembled and exchanged and thus may be easily maintained. Also, the vehicle parking device may be prevented from being secondarily released due to engagement between the worm gear and the rack gear. However, the scope of the disclosure is not limited by this effect.

It should be understood that the embodiments described herein should be considered in a descriptive sense only and not for purposes of limitation. Descriptions of features or aspects within each of the embodiments should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vehicle parking device comprising:
   an actuator configured to rotate a worm gear mounted at an end thereof;
   a loading unit including a rack gear engaged with the worm gear and linearly moving according to a movement of the rack gear;
   a parking sprag in contact with the loading unit and rotating by a linear movement of the loading unit; and
   a parking gear provided on a drive shaft that transmits a driving force and selectively engaged according to a rotation of the parking sprag, and
   wherein the loading unit comprises:
   a housing having an inclined surface, at an end thereof, in contact with the parking sprag;
   a support shaft extending in a longitudinal direction of the housing and having the rack gear mounted thereon; and
   a first elastic member into which the support shaft is inserted and in contact with the rack gear.

2. The vehicle parking device of claim 1, wherein the rack gear linearly moves according to a rotation of the worm gear, receives a compressive force from the first elastic member, and linearly moves together with the housing to rotate the parking sprag.

3. The vehicle parking device of claim 1, wherein the parking sprag comprises:
   a body;
   a protruding end arranged at an end of the body, wherein the protruding end is engaged with the parking gear or separated from the parking gear depending on a direction of the rotation of the parking sprag; and
   an inclined end contacted with the inclined surface of the loading unit.

4. The vehicle parking device of claim 1, further comprising:
   a rod inserted into the parking sprag; and
   a second elastic member inserted into the rod and arranged so that an end thereof is in contact with the parking sprag.

5. A vehicle transmission comprising:
   a casing;
   a first driving unit provided inside the casing and receiving a driving force;
   a second driving unit provided inside the casing and spaced apart from the first driving unit;

a third driving unit between the first driving unit and the second driving unit to transmit a driving force; and a parking device provided in at least one of the first driving unit to the third driving unit, wherein the parking device comprises:

an actuator configured to rotate a worm gear mounted at an end thereof;

a loading unit inserted into a mounting groove of the casing, including a rack gear engaged with the worm gear, and linearly moving according to a movement of the rack gear;

a parking sprag in contact with the loading unit and rotating by a linear movement of the loading unit; and a parking gear provided on at least one of the first driving unit to the third driving unit and selectively engaged according to a rotation of the parking sprag.

* * * * *